(12) United States Patent
Abbott et al.

(10) Patent No.: US 10,109,076 B2
(45) Date of Patent: Oct. 23, 2018

(54) DEPTH-AWARE STEREO IMAGE EDITING METHOD APPARATUS AND COMPUTER-READABLE MEDIUM

(71) Applicant: Brigham Young University, Provo, UT (US)

(72) Inventors: Joshua Abbott, Raleigh, NC (US); Bryan S. Morse, Mapleton, UT (US)

(73) Assignee: Brigham Young University, Provo, UT (US)

( * ) Notice: Subject to any disclaimer, the term of this patent is extended or adjusted under 35 U.S.C. 154(b) by 216 days.

(21) Appl. No.: 14/302,698

(22) Filed: Jun. 12, 2014

(65) Prior Publication Data

US 2014/0368506 A1    Dec. 18, 2014

Related U.S. Application Data

(60) Provisional application No. 61/834,017, filed on Jun. 12, 2013.

(51) Int. Cl.
*G06T 19/20* (2011.01)
*G06T 11/00* (2006.01)
(Continued)

(52) U.S. Cl.
CPC ............ *G06T 11/001* (2013.01); *G06T 19/00* (2013.01); *H04N 13/106* (2018.05); *H04N 13/122* (2018.05)

(58) Field of Classification Search
CPC ... G06T 11/001; G06T 19/00; H04N 13/0007; H04N 13/0018
See application file for complete search history.

(56) References Cited

U.S. PATENT DOCUMENTS 8,379,021 B1 *   2/2013  Miller ................... G06T 15/60
                                                                   345/426
2010/0315488 A1 * 12/2010  Kim ..................... H04N 13/026
                                                                    348/46
(Continued)

OTHER PUBLICATIONS

Dan Moughamian, "Perfecting Focus and Lighting Enhancements in Photoshop CS4", published on Apr. 16, 2009. pp. 1-3. http://www.peachpit.com/articles/article.aspx?p=1332855&seqNum=2.*

(Continued)

*Primary Examiner* — Xiao Wu
*Assistant Examiner* — Chong Wu
(74) *Attorney, Agent, or Firm* — Kunzler, PC (57) ABSTRACT

A method for applying depth-dependent effects to images includes receiving a stereo image and depth related information extracted from the stereo image, and applying an effect to the stereo image according to the depth related information. The method may also include calculating surface orientation information for the stereo image to improve the depth related information extracted from the stereo image and/or facilitate the application of effects, such as scene relighting, which leverage surface orientation information. In some embodiments, the method includes fitting a curved surface to the depth related information and adjusting the depth related information and/or surface orientation information according to the curved surface. The method may also include processing the depth related information with a bilateral smoothing filter wherein coefficients for neighboring pixels are weighted according to similarity in color and similarity in depth. An apparatus and computer-readable medium corresponding to the above method are also disclosed.

16 Claims, 5 Drawing Sheets

(51) Int. Cl.
G06T 19/00 (2011.01)
H04N 13/122 (2018.01)
H04N 13/106 (2018.01)

(56) References Cited

U.S. PATENT DOCUMENTS

| | | | | |
|---|---|---|---|---|
| 2011/0115886 A1* | 5/2011 | Nguyen | ............... | H04N 13/025 348/47 |
| 2012/0249836 A1* | 10/2012 | Ali | ........................ | G06T 5/003 348/239 |
| 2013/0120385 A1* | 5/2013 | Krishnaswamy | ....... | G06T 15/50 345/426 |
| 2013/0129190 A1* | 5/2013 | Cohen | ...................... | G06K 9/00 382/154 |
| 2013/0208093 A1* | 8/2013 | Sun | ........................ | G06T 5/003 348/46 |
| 2013/0271625 A1* | 10/2013 | Gruber | ............... | H04N 5/23212 348/239 |
| 2015/0227779 A1* | 8/2015 | Kawai | ................ | H04N 13/0018 382/154 |

OTHER PUBLICATIONS

Frances Moreno-Noguer et al., "Active Refocusing of Images and Videos", ACM Transactions on Graphics, 26(3):67:1-67:9, 2007.
Daniel Scharstein et al., "A Taxonomy and Evaluation of Dense Two-Frame Stereo Correspondence Algorithms", International Journal of Computer Vision, 47(1-3):7-42, Apr. 2002.
Changyin Zhou et al., "Coded Aperture Pairs for Depth from Defocus", IEEE 12th International Conference on Computer Vision (ICCV), pp. 325-332, Sep. 2009.
David Akers et al., "Conveying Shape and Features with Image-Based Relighting", in IEEE Visualization (VIS'03), pp. 349-354, 2003.
Ashok Veeraraghavan et al., "Dappled Photography: Mask Enhanced Cameras for Heterodyned Light Fields and Coded Aperture Refocusing", ACM Transactions on Graphics, 26(3):69:1-69:12, 2007.
Johannes Kopf et al., "Deep Photo: Model-Based Photograph Enhancement and Viewing", ACM Transactions on Graphics, 27(5):116:1-116:10, 2008.
Soonmin Bae et al., "Defocus Magnification", Computer Graphics Forum, 26(3):571-579, Sep. 2007.
Z. Yu et al., "Dynamic Depth of Field on Live Video Streams: A Stereo Solution", in Computer Graphics International, 2011.
Kyong Joon Lee et al., "Estimation of Intrinsic Image Sequences from Image+Depth Video", European Conference on Computer Vision (ECCV), 2012.
Jaewon Kim et al., "Highlighted Depth-of-Field Photography: Shining Light on Focus", ACM Transactions on Graphics, 30(3):24:1-24:9, May 2011.
Corey Toler-Franklin et al., "Illustration of Complex Real-World Objects using Images with Normals", in International Symposium on Non-Photorealistic Animation and Rendering (NPAR), Aug. 2007.

Anat Levin et al., "Image and Depth from a Conventional Camera with a Coded Aperture", ACM Transactions on Graphics, 26(3):70:1-70:9, 2007.
Michael Kass et al., "Interactive Depth of Field Using Simulated Diffusion on a GPU", Computing, (#06-01), 2006.
Ren Ng et al., "Light Field Photography with a Hand-held Plenoptic Camera", Technical Report CSTR 2005-02, Stanford CS, Apr. 2005.
Marc Levoy et al., "Light Field Rendering", Proceedings of SIGGRAPH 96, Annual Conference Series, pp. 31-42, 1996.
Paul Green et al., "Multi-Aperture Photography", ACM Transactions on Graphics, 26(3):68:1-68:7, 2007.
Jorge Lopez-Moreno et al., "Non-photorealistic, depth-based image editing", Computers & Graphics, 35(1):99-111, Feb. 2011.
Michael Bleyer et al., "PatchMatch Stereo—Stereo Matching with Slanted Support Windows" British Machine Vision Conference, pp. 14.1-14.11, 2011.
Pieter Peers et al., "Post-production facial performance relighting using reflectance transfer", ACM Transactions on Graphics, pp. 52:1-52:10, 2007.
Chia-Kai Liang et al., "Programmable Aperture Photography: Multiplexed Light Field Acquisition", ACM Transactions on Graphics, 27(3):55:1-55:10, 2008.
Xuan Yu et al., "Real-time Depth of Field Rendering via Dynamic Light Field Generation and Filtering", Computer Graphics Forum, 29(7):2099-2107, Sep. 2010.
Marshall F. Tappen et al., "Recovering Intrinsic Images from a Single Image", IEEE Transactions on Pattern Analysis and Machine Intelligence, 27(9):1459-1472, Sep. 2005.
H.G. Barrow et al., "Recovering Intrinsic Scene Characteristics From Images", Computer Vision Systems, pp. 3-26. Academic Press, 1978.
Guofeng Zhang et al., "Refilming with Depth-Inferred Videos", IEEE Transactions on Visualization and Computer Graphics, 15(5):828-840, 2009.
Kevin Karsch, et al., "Rendering Synthetic Objects into Legacy Photographs", ACM Transactions on Graphics, 30(6):157:1-157:12, 2011.
Berthold K. P. Horn, "Shape From Shading: A Method for Obtaining the Shape of a Smooth Opaque Object From One View", Technical report, MIT, 1970.
Raanan Fattal, "Single Image Dehazing", ACM Transactions on Graphics, 27(3):72:1-72:9, 2008.
M. Gopi et al., "Surface Reconstruction based on Lower Dimensional Localized Delaunay Triangulation", Computer Graphics Forum, 19:467-478, 2000.
Ammon Shashua et al., "The Quotient Image: Class Based Re-rendering and RecognitionWith Varying Illuminations", IEEE Transactions on Pattern Analysis and Machine Intelligence, 23(2):129-139, Feb. 2001.
Youichi Horry et al., "Tour Into the Picture: Using a Spidery Mesh Interface to Make Animation from a Single Image", Proceedings of SIGGRAPH 97, Annual Conference Series, pp. 225-232, 1997.
Yosuke Bando et al., "Towards Digital Refocusing from a Single Photograph", Proceedings of the 15th Pacific Conference on Computer Graphics and Applications, pp. 363-372, 2007.

* cited by examiner

DEPTH-AWARE STEREO IMAGE EDITING METHOD APPARATUS AND COMPUTER-READABLE MEDIUM

CROSS-REFERENCE TO RELATED APPLICATIONS

This application claims the benefit of U.S. provisional application 61/834,017 entitled "Interactive Depth-Aware Effects for Stereo Image Editing" and filed on 12 Jun. 2013. The foregoing application is incorporated herein by reference.

BACKGROUND

Technical Field

The subject matter disclosed herein relates means and methods for editing images in general and to devices and methods for applying depth-aware effects to stereo images in particular.

Discussion of the Background

Depth-based effects are commonly employed in three-dimensional rendering. What is needed is the ability for users to apply depth-based effects to captured images.

SUMMARY OF THE INVENTION

The present invention has been developed in response to the present state of the art, and in particular, in response to capabilities that have not yet been provided by currently available image capture and editing devices, methods and systems. Accordingly, the present invention has been developed to provide a method, apparatus, and computer readable medium for applying depth-dependent effects to stereo images.

As described herein, a method for applying depth-dependent effects to stereo images includes receiving a stereo image comprising a left and a right image of a scene, receiving depth related information extracted from the stereo image, and applying an effect to the stereo image according to the depth related information. The depth related information may comprise disparity information that describes the offset (e.g., in pixels) of features that are common to the left and right images.

Examples of depth-dependent effects include highlighting, relighting, hazing, and blurring. The depth-dependent effects may be pipelined in an order that corresponds to the propagation of light. The method may also include calculating surface orientation information for the stereo image to improve the depth related information extracted from the stereo image and/or facilitate the application of effects, such as scene relighting, which leverage surface orientation information.

In some embodiments, the method includes fitting a curved surface to the depth related information and adjusting the depth related information and/or surface orientation information according to the curved surface. The method may also include processing the depth related information with a bilateral smoothing filter wherein coefficients for neighboring pixels are weighted according to similarity in color and similarity in depth.

An apparatus and computer-readable medium corresponding to the above method are also described herein. It should be noted that references throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following description and appended claims, or may be learned by the practice of the invention as set forth hereinafter.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1A:
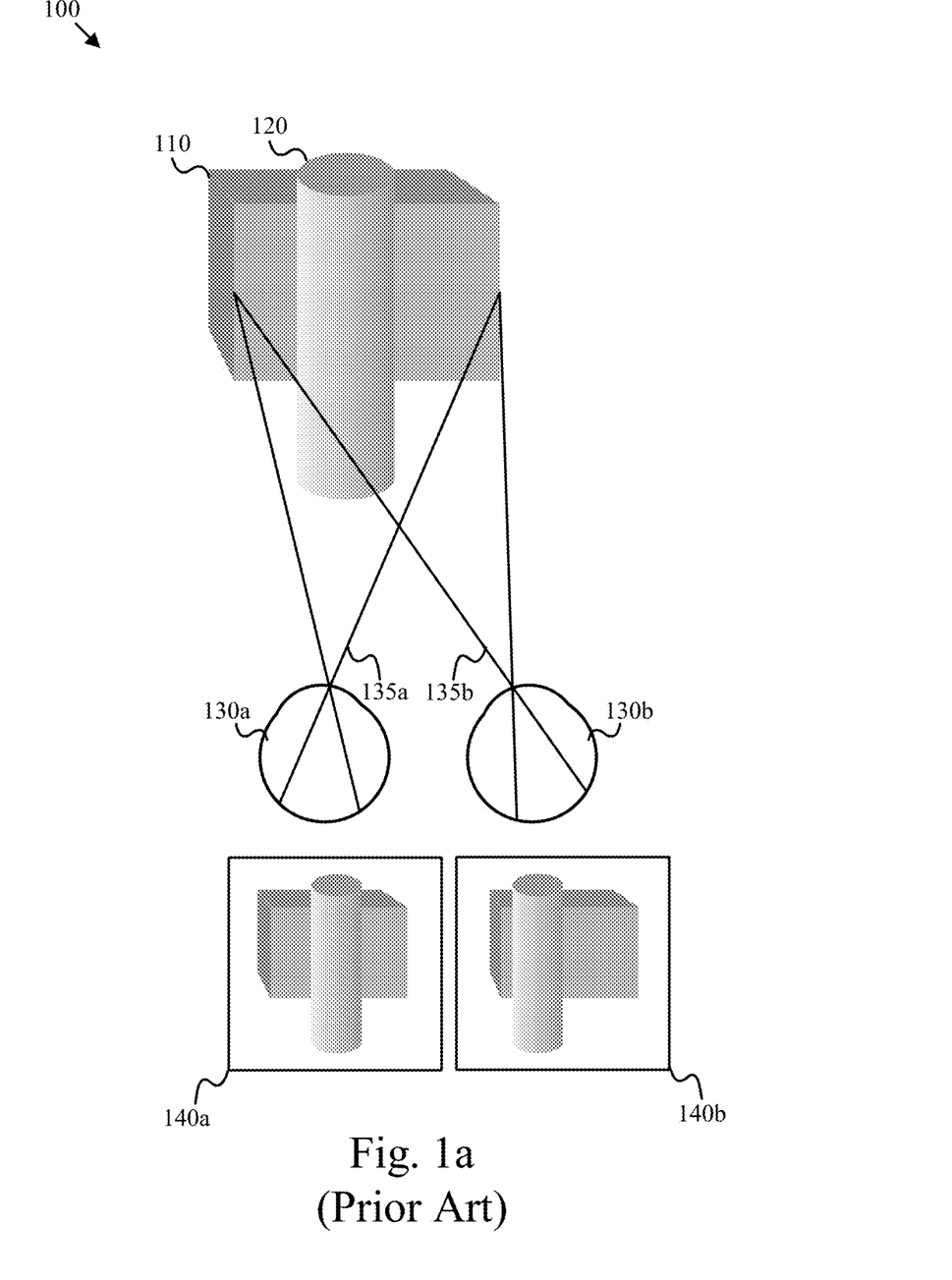
FIG. 1a is a geometric diagram depicting stereo image disparity.

FIG. 1 is a geometric diagram depicting stereo image disparity. The depicted diagram includes a background object 110, a foreground object 120, stereo image receptors 130a and 130b, visual field markers 135a and 135b, a left image 140a, and a right image 140b. The stereo image receptors 130a and 130b are depicted as eyes, but may be any pair of image sensors, such as optical cameras, charged-coupled device (CCD) image sensors, active pixel sensors, or the like.

Figure 1B:
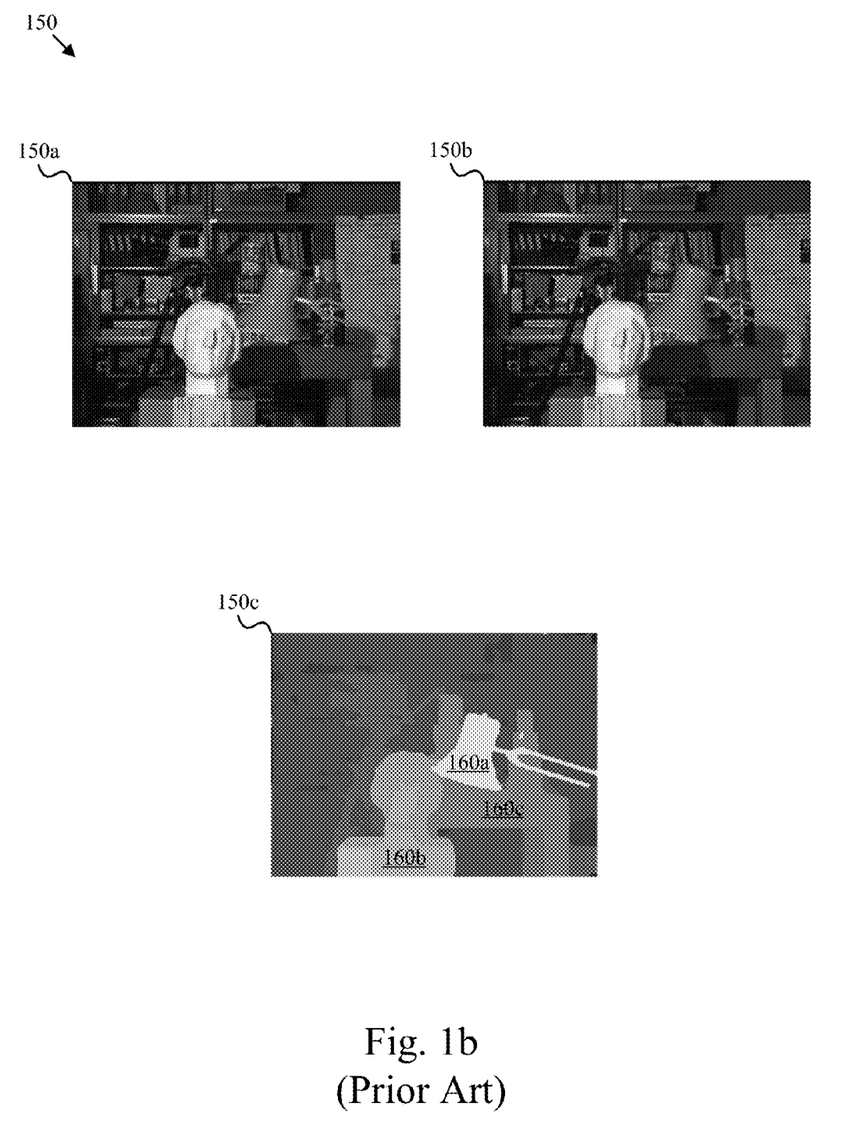
FIG. 1b is a set of images depicting disparity for a particular stereo image.

Due to the distance separating the pair of stereo image receptors 130, the foreground object 120 appears to be shifted to the right relative to a background object 110 in the left image 140a, and to the left relative to a background object 110 in the right image 140b. When the two images are compared, the amount of offset (e.g., in pixels) between specific features in the left and right images is referred to as disparity and is inversely proportional to the depth of the feature in the image. Consequently, foreground features within stereo images will have more disparity that background features. For example, FIG. 1b is a set of images 150 depicting stereo image disparity including a left image 150a, a right image 150b, and a disparity image 150c. The depicted disparity image 150c has regions of common disparity 160 that correspond to objects found within the images 150a and 150b. Shapes with greater disparity (and lesser depth) correspond to regions of higher intensity. Consequently, region 160a corresponds to an object that is closer to the image receptors 130 than the object corresponding to region 160b, which in turn is closer than the object corresponding to region 160c.

Figure 2:
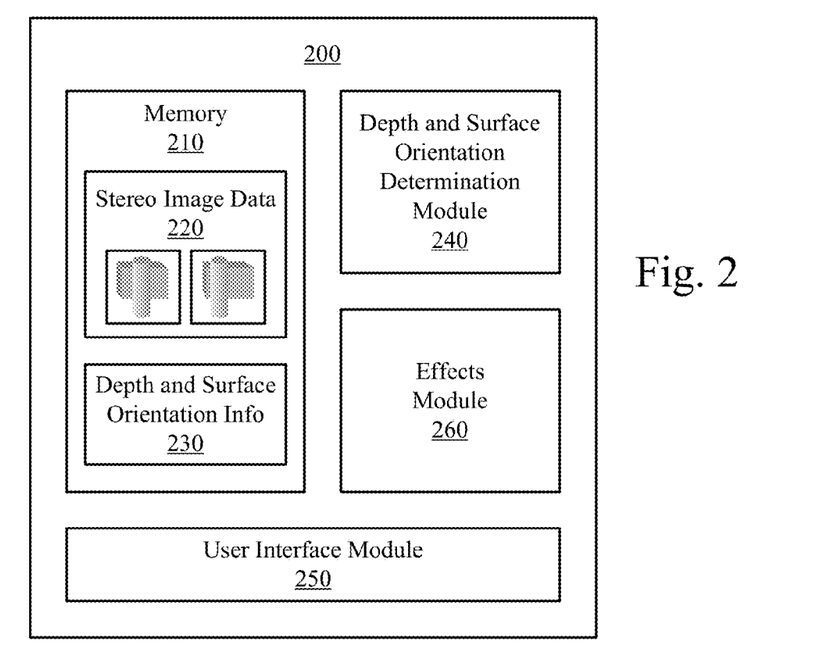
FIG. 2 is a block diagram depicting one embodiment of a depth-aware effects apparatus.

FIG. 2 is a block diagram depicting one embodiment of a depth-aware effects apparatus 200. As depicted, the effects apparatus 200 includes a memory 210, a depth and surface orientation determination module 240, a user interface module 250, and an effects module 260.

The memory 210 may store stereo image data 220 and related information such as depth and surface orientation information 230. The depth and surface orientation information 230 may be extracted by the depth and surface orientation determination module 240 from the stereo image data 220.

The user interface module 250 may enable a user to specify which image to process and which effects should be applied to the selected image. The selected image may be a stereo image to which depth-dependent effects may be applied. Examples of depth-dependent effects include highlighting, relighting, hazing, and blurring. The effects module 260 may apply the user selected effects to the selected image and provide a stereo or non-stereo processed image (not shown) with depth-dependent effects applied thereto.

Figure 3:
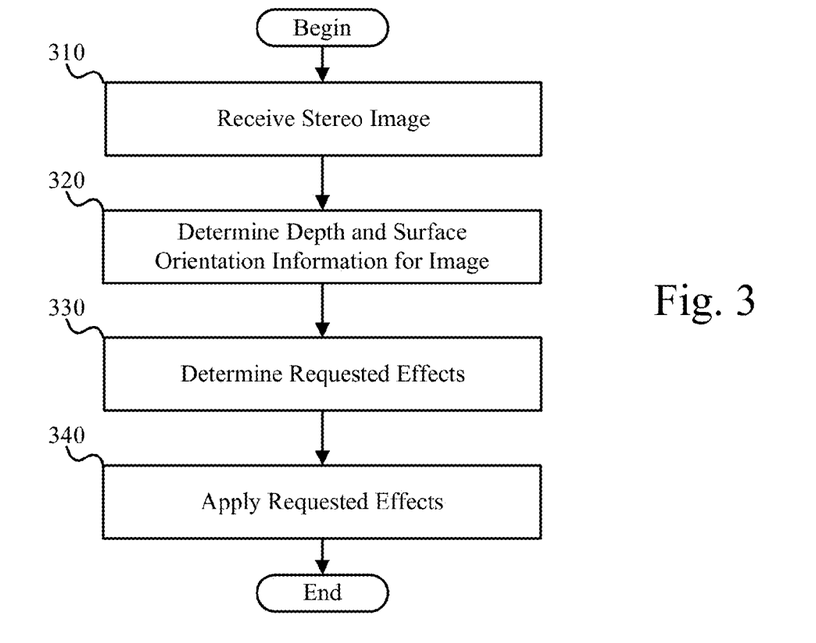
FIG. 3 is a flowchart diagram depicting one embodiment of a depth-aware effects processing method.

FIG. 3 is a flowchart diagram depicting one embodiment of a depth-aware effects processing method 300. As depicted, the depth-aware effects processing method 300 includes receiving 310 a stereo image, determining 320 depth and surface orientation information for the image, determining 330 one or more requested effects, and applying 340 the requested effects. The method 300 may be executed by an image capture apparatus 200 (or the like) such as a stereo digital camera, video camera, cell phone, tablet, or laptop, or an image editing apparatus 200 (or the like) such as personal computer, workstation, or web server.

Receiving 310 a stereo image may include receiving left and right images that are captured by one or more imaging devices. Determining 320 depth and surface orientation information for the image may include executing various algorithms that extract depth and surface orientation information. The depth and surface orientation information may be jointly estimated by coupling complimentary algorithms that use iterative feedback to converge to a solution.

Determining 330 one or more requested effects may include receiving user input as to which effects should be applied to a stereo image. Applying 340 the requested effects may include executing an effects pipeline that applies the effects in an order that corresponds to the propagation of light in an imaging scene.

Figure 4:
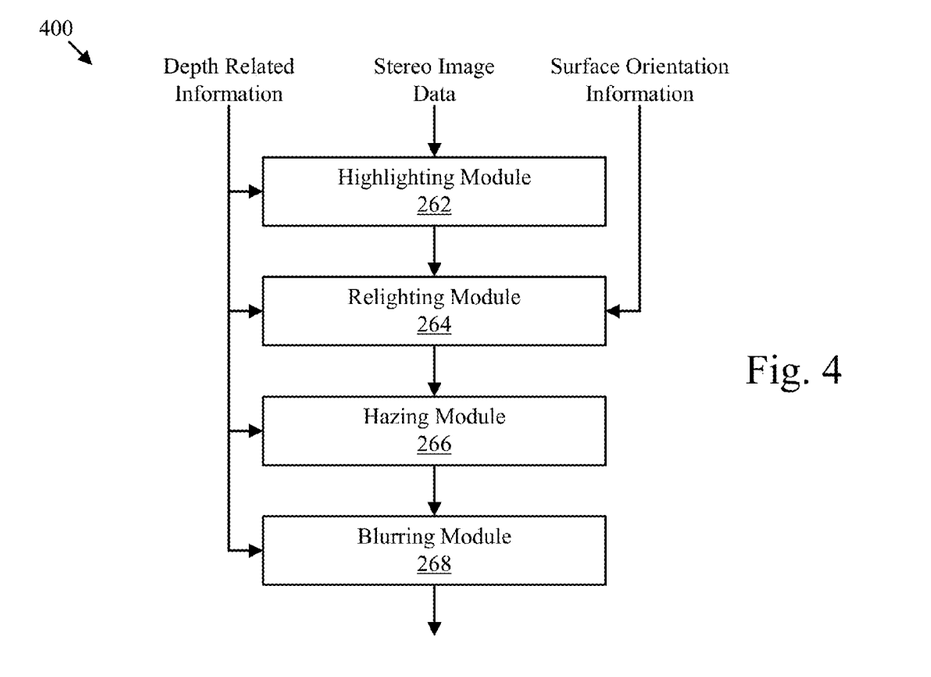
FIG. 4 is a block diagram depicting one embodiment of a depth-aware effects pipeline.

FIG. 4 is a block diagram depicting one embodiment of a depth-aware effects pipeline 400. As depicted, the depth-aware effects pipeline 400 includes a highlighting stage (or module) 262, a relighting stage 264, a hazing stage 266, and a blurring stage 268. The depicted pipeline 400 applies imaging effects corresponding to each stage in an order that corresponds to the propagation of light in an imaging scene.

The highlighting stage 262 may change the intensity or color of pixels within an image according to the calculated depth of each pixel. The relighting stage 264 may adjust the intensity or color of pixels within an image according to both the depth and surface orientation of each pixel. For example, pixels that are oriented toward a selected virtual lighting source (i.e., 3D spatial position) may be brightened while pixels that are oriented away from the selected virtual lighting source may be darkened.

The hazing stage 266 may de-saturate pixels according to their depth or conduct a similar change that simulates the scattering of light. For example, pixels that are in the background may have higher levels of white mixed in than pixels that are in the foreground.

The blurring stage 268 may blur pixels according to depth. For example, a user may indicate that foreground objects are to be blurred (or conversely remain in focus) relative to background objects or that background objects are to be blurred (or conversely remain in focus) relative to foreground objects. In some embodiments, the user selects a particular point or region on an image to select a reference depth for blurring operations. For example, pixels which have similar depths may remain in focus while pixels with dissimilar depths may be blurred proportional to the difference in depth with the reference depth.

Figure 5:
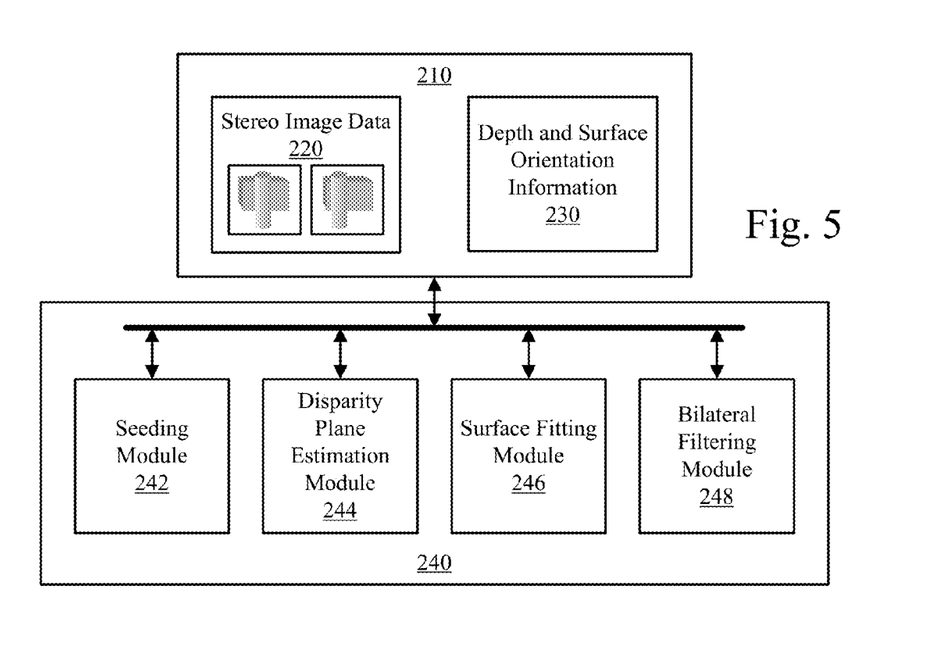
FIG. 5 is a block diagram depicting additional details of one embodiment of the depth-aware effects apparatus of FIG. 2.

FIG. 5 is a block diagram depicting additional details of one embodiment of the depth-aware effects apparatus 200. Specifically, the depth and surface orientation determination module 240 may have one or more sub-modules that facilitate the determination of the depth and surface orientation information extracted from the stereo image data 220 and stored in the memory 210 as the depth and surface orientation information 230. In the depicted embodiment, the modules include a seeding module 242, a disparity plane estimation module 244, a surface fitting module 246, and a bilateral filtering module 248.

Figure 6:
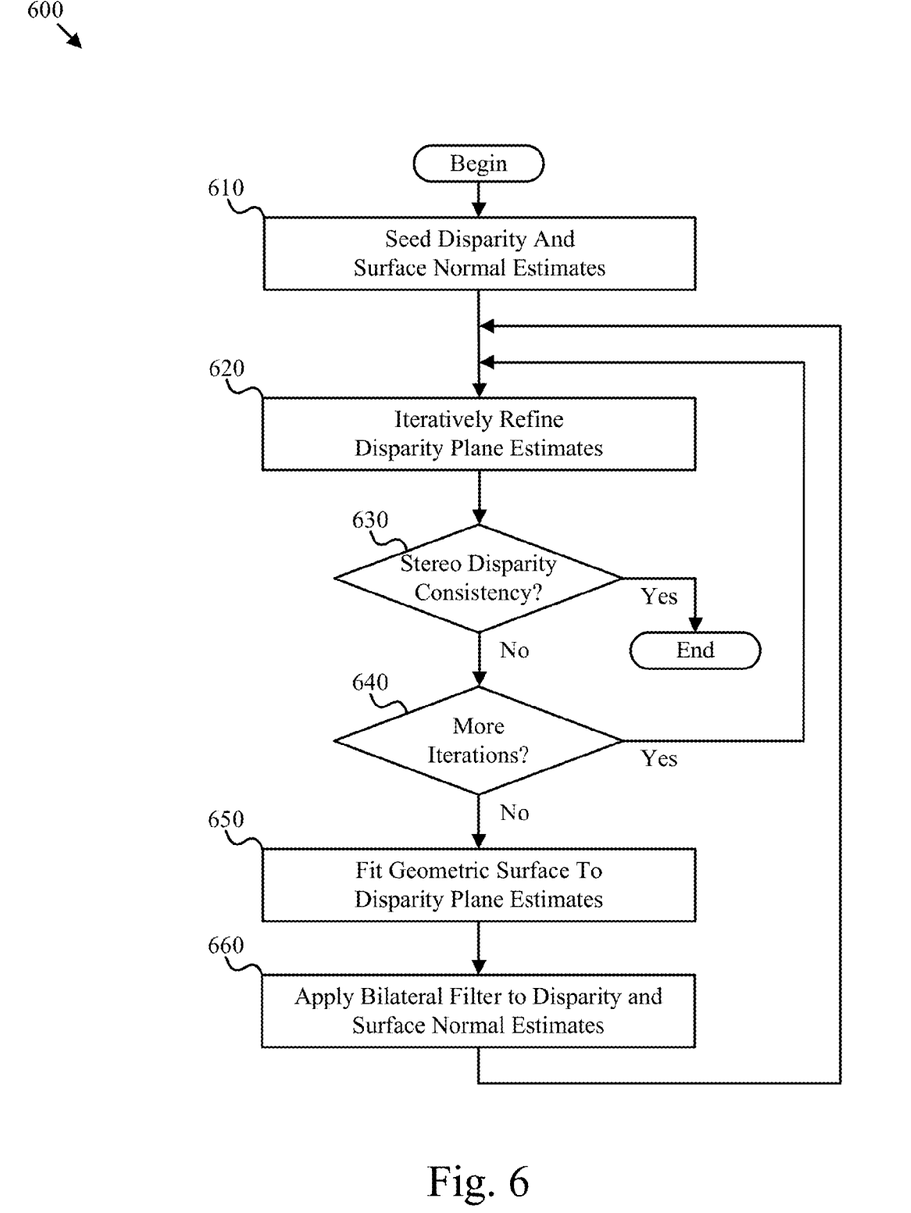
FIG. 6 is a flowchart diagram depicting one embodiment of a stereo image disparity estimation method.

FIG. 6 is a flowchart diagram depicting one embodiment of a stereo image disparity estimation method 600 that may be executed by the modules depicted in FIG. 5 or a similar apparatus. As depicted, the method 600 includes seeding 610, iteratively refining 620 disparity plane estimates, fitting 650 a geometric surface to the disparity plane estimates, and applying 660 a bilateral filter to the disparity and surface normal estimates. The functionality provided by the elements depicted in FIGS. 5 and 6 will be jointly described in greater detail below.

Seeding 610 may include initializing disparity plane estimates for each pixel in each stereo image. Each disparity plane may be represented as an offset value (e.g., in pixels) and a surface orientation (e.g., a surface normal vector). In one embodiment, the disparity plane estimates are initialized to random values. The seeding operation 610 may be performed by the seeding module 242, or the like.

Iteratively refining 620 may include iteratively refining the disparity plane estimates. In one embodiment, the estimates are refined according to the "Patchmatch stereo" algorithm of Bleyer et al. See "Patchmatch stereo—stereo matching with slanted support windows" in British Machine Vision Conference, pages 14.1 to 14.11, 2011 which is incorporated herein by reference. The refining operation 620 may be conducted by the disparity plane estimation module 244.

Fitting 650 a geometric surface to the disparity plane estimates may include using depth information (e.g., derived from disparity offset values) to fit a parameterized surface to the depth values as a function of (pixel) position. For example, the geometric surface may be a 3-D surface such as a NURBS surface or T-spline surface that is defined by a set of control points that are derived from the depth values. In one embodiment, surface normal information is also factored into the fitted surface. The fitting operation 650 may be conducted by the surface fitting module 246.

Applying 660 a bilateral filter to the disparity and surface normal estimates may include weighting neighboring pixels according to depth similarity and/or color similarity. Applying such a weighting may smooth the disparity and surface normal data while reducing the contribution from pixels that correspond to a different object in a scene. The applying operation 660 may be conducted by the bilateral filtering module 248.

In the depicted embodiment, the refining operation 620 is executed until disparity consistency is achieved between the left and right images as tested for in step 630, or until a pre-determined number of iterations have been completed as tested for in step 640. Subsequent to iterating the refining operation 620, the method advances to the fitting operation 650 and the bilateral filtering operation 660. The method may repetitively perform operations 620, 640, and 650 until the desired level of disparity consistency is achieved.

One of skill in the art will appreciate that the operations depicted in the method 600 are shown as serial operations for purposes of simplicity. However, the depicted operations and corresponding modules 244, 246, and 248 may be jointly and/or concurrently executed. For example, one or more GPUs (such as those found in high-end cell phones and tablets) may be allocated to each of the depicted modules in order to facilitate concurrent execution. The GPUs may coordinate updates to the depth and surface orientation information 230 via a shared memory such as the memory 210 depicted in FIGS. 2 and 5.

The above described methods, and corresponding apparatus and computer-readable medium, enable the application of depth-dependent effects to stereo images. While for purposes of enablement, specific embodiments are disclosed herein, the invention is not limited to those embodiments.

It should also be noted that some of the functional units described herein, as well as the methods described herein, may be embodied as modules. The various modules may include a variety of hardware components that provide the described functionality including one or more processors such as CPUs or microcontrollers, or programmable logic devices (i.e., hardware components) that are configured by one or more software components. The software components may include executable instructions or codes and corresponding data that are stored in a non-transitory computer-readable storage medium such as a non-volatile memory, or the like. The instructions or codes may include machine codes that are configured to be executed directly by the processor. Alternatively, the instructions or codes may be configured to be executed by an interpreter, or the like, that translates the instructions or codes to machine codes that are executed by the processor.

A module or a set of modules may also be implemented (in whole or in part) as a processor configured with software to perform the specified functionality. For example, modules may be implemented as one or more servers configured to provide one or more services. An identified module may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, the executable code of a module may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference to a computer-readable medium may take any tangible form capable of enabling execution of a program of machine-readable instructions on a digital processing apparatus. For example, a computer readable medium may be embodied by a flash drive, compact disk, digital-video disk, a magnetic tape, a Bernoulli drive, a magnetic disk, a punch card, flash memory, integrated circuits, or other memory device suitable for storing information for a digital processing apparatus. A digital processing apparatus such as a computer may store program codes, associated data, and the like on the computer readable medium that when retrieved enable the digital processing apparatus to execute the functionality specified by the modules.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for applying depth-dependent effects to stereo images, the method comprising:
receiving a stereo image comprising a left and a right image of a scene;
receiving depth related information extracted from the stereo image;
receiving requested effects information that indicates which effects of a plurality of pipelined effects are to be applied to the stereo image wherein the plurality of pipelined effects comprise a highlighting effect followed by a relighting effect followed by a hazing effect followed by a blurring effect, wherein the relighting effect comprises adjusting a color of pixels within the stereo image according to both a depth and a surface orientation of the pixels; and
applying each requested effect to the stereo image according to the depth related information.

2. The method of claim 1, comprising fitting a curved surface to the depth related information.

3. The method of claim 2, comprising adjusting the depth related information according to the curved surface.

4. The method of claim 2, comprising adjusting surface orientation information according to the curved surface.

5. The method of claim 1, wherein the depth related information comprises disparity information.

6. The method of claim 1, comprising processing the depth related information with a bilateral smoothing filter.

7. The method of claim 6, wherein the bilateral smoothing filter is weighted according to similarity in color and similarity in depth.

8. The method of claim 1, comprising calculating surface orientation information for the stereo image.

9. The method of claim 8, wherein the effect to the stereo image leverages the surface orientation information.

10. The method of claim 8, comprising processing the surface orientation information with a bilateral smoothing filter.

11. An apparatus for applying depth-dependent effects to stereo images, the apparatus comprising:
a memory configured to store a stereo image comprising a left and a right image of a scene;
a depth determination module configured to extract depth related information from the stereo image;
a user interface module configured to receive requested effects information that indicates which effects of a plurality of pipelined effects are to be applied to the stereo image wherein the plurality of pipelined effects comprise a highlighting effect followed by a relighting effect followed by a hazing effect followed by a blurring effect, wherein the relighting effect comprises adjusting a color of pixels within the stereo image according to both a depth and a surface orientation of the pixels; and
an effects module configured to apply each requested effect to the stereo image according to the depth related information.

12. The apparatus of claim 11, wherein the effects module comprises a plurality of pipelined stages corresponding to light propagation in an imaging scene.

13. The apparatus of claim 11, comprising a surface fitting module configured to fit a curved surface to the depth related information.

14. The apparatus of claim 13, wherein the surface fitting module is configured to adjust the depth related information according to the curved surface.

15. The apparatus of claim 13, wherein the surface fitting module is configured to adjust surface orientation information according to the curved surface.

16. A non-transitory computer-readable medium comprising instructions encoded therein for executing a method for applying depth-dependent effects to stereo images, the method comprising:
receiving a stereo image comprising a left and a right image of a scene;
receiving depth related information extracted from the stereo image;
receiving requested effects information that indicates which effects of a plurality of pipelined effects are to be applied to the stereo image wherein the plurality of pipelined effects comprise a highlighting effect followed by a relighting effect followed by a hazing effect followed by a blurring effect, wherein the relighting effect comprises adjusting a color of pixels within the stereo image according to both a depth and a surface orientation of the pixels; and
applying each requested effect to the stereo image according to the depth related information.

* * * * *